(12) United States Patent
Watanabe (10) Patent No.: US 11,649,662 B2
(45) Date of Patent: May 16, 2023

(54) CAR DOOR MONITORING SYSTEM AND CAR DOOR MONITORING METHOD

(71) Applicant: PANASONIC INTELLECTUAL PROPERTY MANAGEMENT CO., LTD., Osaka (JP)

(72) Inventor: Takeshi Watanabe, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 911 days.

(21) Appl. No.: 16/494,874

(22) PCT Filed: Jan. 29, 2018

(86) PCT No.: PCT/JP2018/002742
§ 371 (c)(1),
(2) Date: Sep. 17, 2019

(87) PCT Pub. No.: WO2018/179781
PCT Pub. Date: Oct. 4, 2018

(65) Prior Publication Data
US 2020/0284082 A1    Sep. 10, 2020

(30) Foreign Application Priority Data
Mar. 29, 2017  (JP) .............................. JP2017-064272

(51) Int. Cl.
*B61D 19/02* (2006.01)
*E05F 15/73* (2015.01)
(Continued)

(52) U.S. Cl.
CPC ............ *E05F 15/40* (2015.01); *B61D 19/026* (2013.01); *B61L 23/00* (2013.01); *E05F 15/73* (2015.01);
(Continued)

(58) Field of Classification Search
CPC ........ E05F 15/40; E05F 15/73; B61D 19/026; B61L 23/00; E05Y 2900/51; E05Y 2900/531; G06T 2207/30248
(Continued)

(56) References Cited

U.S. PATENT DOCUMENTS

2016/0057138 A1\* 2/2016 Hoyos .................. G06V 40/168
726/7

FOREIGN PATENT DOCUMENTS

JP          09071240 A  \*  3/1997
JP       2002308097 A  \* 10/2002  ............ B61L 15/009
(Continued)

OTHER PUBLICATIONS

JP2011240846A (ISAO) (Dec. 1, 2011) (machine translation) (Year: 2011).\*

(Continued)

*Primary Examiner* — Mahmoud Gimie
(74) *Attorney, Agent, or Firm* — Greenblum & Bernstein, P.L.C.

(57) ABSTRACT

Even in a case where an external camera image-captures a door of a car, with high precision, it can be set to be determined whether or not a foreign substance inserted into the door is present. A monitoring apparatus acquires a camera image that results from a camera image-capturing the vicinity of a door of a car using an external camera, from a camera. A processor of the monitoring apparatus detects the door from the camera image, sets a determination area based on a position of the detected door, acquires an image of the determination area from the camera image, determines whether or not a foreign substance inserted into the door is present, based on the image of the determination area, and performs report outputting to a monitor and a reporting apparatus according to a result of the determination.

9 Claims, 9 Drawing Sheets

(51) Int. Cl.
  *B61L 23/00* (2006.01)
  *E05F 15/40* (2015.01)
(52) U.S. Cl.
  CPC ..... *E05Y 2900/51* (2013.01); *E05Y 2900/531* (2013.01); *G06T 2207/30248* (2013.01)
(58) Field of Classification Search
  USPC ........................................................ 105/343
  See application file for complete search history.

(56) References Cited

FOREIGN PATENT DOCUMENTS

| | | |
|---|---|---|
| JP | 4163428 | 8/2008 |
| JP | 4280363 | 3/2009 |
| JP | 2009-279970 | 12/2009 |
| JP | 2011240846 A * | 12/2011 |
| JP | 2012-011988 | 1/2012 |
| JP | 2014-054898 | 3/2014 |

OTHER PUBLICATIONS

International Search Report issued in International Pat. Appl. No. PCT/2018/002742, dated Apr. 24, 2018.

\* cited by examiner

CAR DOOR MONITORING SYSTEM AND CAR DOOR MONITORING METHOD

TECHNICAL FIELD

The present disclosure relates to a car door monitoring system and a car door monitoring method in which it is determined whether or not a foreign substance inserted into a door is present, based on a camera image that results from an external camera image-capturing the vicinity of the door of a car, and reporting is performed according to a result of the determination.

BACKGROUND ART

In some cases, luggage of a passenger, for example, an umbrella, a bag, or the like is inserted into a door through which the passenger gets on or gets off a train (a railroad car) that stops in a railroad station. In a case where a station staff member or a crew member of a train finds these foreign substances that are inserted, he/she can take action to remove the foreign substances, but in recent years, many accidents have occurred such as one in which a train starts to be moved with the foreign substance inserted into the door. For this reason, it is desirable that it is detected that the foreign substance is inserted into the door and that it is reported to the station staff member or the crew member of the train that the insertion of the foreign substance occurs.

As a technology that detects and reports that the foreign substance is inserted into the door of the car, in the related art, a technology is known that determines whether or not the foreign substance inserted into the door is present, based on a camera image that results from image-capturing by a camera provided on an upper portion of a door in a body of a train, that displays the camera display on a monitor provided in a crew member room in a case where the insertion of the foreign substance occurs, and thus that a crew member can visually check a situation of the inserted foreign substance (refer to PTL 1).

CITATION LIST

Patent Literature

PTL 1: Japanese Patent No. 4163428 B2

SUMMARY OF THE INVENTION

In the technology in the related art, there is a need to provide a camera on all trains, and in a train on which a camera is not provided, there is a problem in that it cannot be detected that the foreign substance is inserted in the door.

In order to solve this problem, it is considered that the camera is installed on the side of a platform, not on the body of the train. However, in some cases, all trains do not stop at the same position, and thus, a stopping position of the train stops is shifted. For this reason, in a camera installed on the side of the platform, a position of the door within the camera image is shifted as well according to the stopping position of the train being shifted, and thus there occurs in that with high precision, it cannot be determined whether or not the foreign substance is inserted into the door.

Thus, an object of the present disclosure is to provide a car door monitoring system and a car door monitoring method in which even in a case where an external camera image-captures a door of a car, with high precision, it can be determined whether or not a foreign substance is inserted into the door.

According to an aspect of the present disclosure, there is provided a car door monitoring system in which processing that determines whether or not a foreign substance inserted into a door is present, based on a camera image which results from an external camera image-capturing the vicinity of the door of a car and performs reporting according to a result of the determination is performed by a processor. In the system, process has a configuration in which the door is detected from the camera image, in which a determination area is set based on a position of the detected door, in which an image of the determination area is acquired from the camera image, in which whether or not the foreign substance inserted into the door is present is determined based on the image of the determination area, and in which the report outputting is performed according to a result of the determination.

Furthermore, according to another aspect of the present disclosure, there is provided a car door monitoring method in which processing that determines whether or not a foreign substance inserted into a door is present, based on a camera image which results from an external camera image-capturing the vicinity of the door of a car and performs reporting according to a result of the determination is performed by a processor. In the method, a configuration is employed in which the door is detected from the camera image, in which a determination area is set based on a position of the detected door, in which an image of the determination area is acquired from the camera image, in which whether or not the foreign substance inserted into the door is present is determined based on the image of the determination area, and in which the report outputting is performed according to a result of the determination.

According to the present disclosure, the door is detected from the camera image, and thus the determination area is set based on a position of the detected door. For this reason, even in a case where the position of the door in the camera image is shifted according to a stopping position of a train being shifted, the external camera image-captures the car door and thus the determination area can be suitably set, thereby determining with high precision whether or not the foreign substance is inserted into the door.

DESCRIPTION OF EMBODIMENT

According to a first invention, which was made to solve the problem described, there is provided a car door monitoring system in which processing that determines whether or not a foreign substance inserted into a door is present, based on a camera image which results from an external camera image-capturing the vicinity of a car door and performs reporting according to a result of the determination is performed by a processor. In the system, the processor is configured to detect the door from the camera image, to set a determination area based on a position of the detected door, to acquire an image of the determination area from the camera image, to determine whether or not the foreign substance inserted into the door is present, based on the image of the determination area, and to perform report outputting according to a result of the determination.

When this is done, the door is detected from the camera image and the determination area is set based on the position of the detected door. For this reason, even in a case where the position of the door in the camera image is shifted according to a stopping position of a train being shifted, the external camera image-captures the car door and thus the determination area can be suitably set, thereby determining with high precision whether or not the foreign substance is inserted into the door.

Furthermore, according to a second invention, the processor is configured to determine whether or not the foreign substance inserted into the door is present, using a discriminator that learns two classes, a normal state where a foreign substance is not inserted and an abnormal state where a foreign substance is inserted.

When this is done, with high precision, it can be determined whether or not the foreign substance is inserted into the door.

Furthermore, according to a third invention, the processor is configured to detect an opening area of the door, which is projected onto the camera image, and to set the determination area based on a position of the opening area.

When this is done, the determination area can be suitably set.

Furthermore, according to a fourth invention, the processor is configured to detect a door-end portion of the door, which is projected onto the camera image and to set the determination area based on a position of the door-end portion.

When this is done, the determination area can be suitably set.

Furthermore, according to a fifth invention, the processor is configured to determine whether or not the foreign material inserted into the door is present, at a timing at which a state where the door is detected from the camera image has continued for a prescribed time.

When this is done, erroneous detection when detecting the door can be suppressed.

Furthermore, according to a sixth invention, the processor is configured to determine whether or not the foreign substance inserted into the door is present, at a timing at which processing that detects the door from a camera image has been completely performed on a prescribed number of doors or greater.

When this is done, erroneous detection when detecting the door can be suppressed.

Furthermore, according to a seventh invention, the processor is configured to transmit a control signal for causing a reporting apparatus to perform a prescribed reporting operation as the report outputting.

When this is done, because the reporting operation in accordance with a result of the determination of whether or not the foreign substance inserted into the door is present is performed by the reporting apparatus, an employee can immediately know a situation where the foreign substance is inserted.

Furthermore, according to an eighth invention, the processor is configured to display a state image in accordance with whether or not the foreign substance inserted into the door is present, on a display device, as the report outputting, in a manner that is superimposed on the camera image.

When this is done, because the state image in accordance with whether or not the foreign substance inserted into the door is present is displayed in a manner that is superimposed on the camera image, the employee can know a situation where the foreign substance is inserted, immediately and in detail.

Furthermore, according to a ninth invention, the processor is configured to transmit a notification signal for causing a portable terminal that the employee carries with him/her to perform a prescribed reporting operation, as the report outputting.

When this is done, because it can be reported to an employee (a station staff member, a person in charge of monitoring, or the like) who stays in a station platform that the inserting of the foreign substance into the door occurs, the employee can quickly start to remove the foreign substance.

Furthermore, according to a tenth invention, there is provided a car door monitoring method in which processing that determines whether or not a foreign substance inserted into a door is present, based on a camera image which results from an external camera image-capturing the vicinity of a car door and performs reporting according to a result of the determination is performed by a processor. In the method, a configuration is employed in which the door is detected from the camera image, in which a determination area is set based on a position of the detected door, in which an image of the determination area is acquired from the camera image, in which whether or not the foreign substance inserted into the door is present is determined based on the image of the determination area, and in which the report outputting is performed according to a result of the determination.

When this is done, as is the case with the first invention, even in a case where the external camera image-captures the car door, with high precision, it can be determined whether the foreign substance is inserted into the door.

An embodiment will be described below with reference to the drawings.

Figure 1:
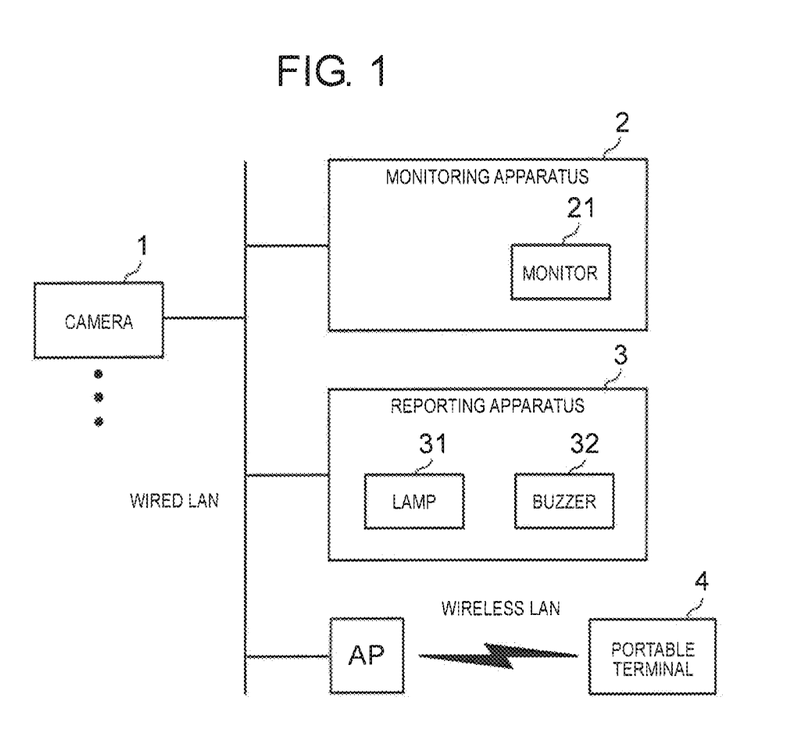
FIG. 1 is a diagram of an entire configuration of a car door monitoring system according to the present embodiment.

FIG. 1 is a diagram of an entire configuration of the car door monitoring system according to the present embodiment.

The car door monitoring system detects that the foreign substance is inserted into the door through which a passenger gets on and gets off a train (a railroad car) that stops in a railroad station, and reports an insertion state of the foreign substance in the door, to the employee (the station staff member or a crew member, such as a conductor). The car door monitoring system includes multiple cameras 1, monitoring apparatus 2, reporting apparatus 3, and portable terminal 4.

Camera 1, monitoring apparatus 2, and reporting apparatus 3 are connected to each other through a wired local area network (LAN). Furthermore, portable terminal 4 is connected to monitoring apparatus 2 through a wireless LAN. No limitation to the wired IAN and the wireless LAN is imposed and a suitable communication scheme may be employed.

Camera 1 image-captures the vicinity of a door of a train that stops in a station. Camera 1 transmits the camera image generated by the image-capturing to monitoring apparatus 2 over the wired LAN.

Monitoring apparatus 2 is configured as an information processing apparatus, such as a PC, and an application program for monitoring the car door is installed. In monitoring apparatus 2, the camera image is received that is transmitted from camera 1, the door is detected from the camera image, and processing is performed that detects the insertion state of the foreign substance in the door. Monitoring apparatus 2 is installed in a monitoring room of a station.

Furthermore, monitoring apparatus 2 includes monitor 21 (a display device). The camera image is displayed on the monitoring screen of monitor 21, and the employee (the station staff member or the like) can check an actual situation of a monitoring area. Furthermore, the state where the foreign substance is inserted into the door is displayed the monitoring screen of monitor 21, and the insertion state of the foreign substance in the door is reported to the employee.

Monitor 21 may be installed in the monitoring room in such a manner that the employee can view the monitoring screen, but may be installed in the platform in such a manner that the employee (the station staff member, the crew member, the person in charge of monitoring, or the like) can review the monitoring screen. Furthermore, the monitor is installed in a crew member room (a conductor room or the like) of a train, and thus screen information may be transmitted from monitoring apparatus 2 through a suitable wireless communication in such a manner that the crew member (the conductor or the like) in the train can view the monitoring screen. Furthermore, in the same manner as on the monitor, the insertion state of the foreign substance in the door may be displayed on a digital signage that is installed in the station platform.

Reporting apparatus 3 includes lamp 31 and buzzer 32. By lighting lamp 31 and sounding buzzer 32, the insertion state of the foreign substance in the door is reported to the employee. In reporting apparatus 3, control information that is transmitted from monitoring apparatus 2 is received, and lamp 31 and buzzer 32 perform a prescribed reporting operation based on the control information. Reporting apparatus 3 may be installed in the monitoring room or the like of the station, but may be installed in the crew member room in the train (the conductor room or the like) and thus may transmit the control information from monitoring apparatus 2 through a suitable wireless communication for reporting to the crew member (the conductor or the like) in the train.

Portable terminal 4 is a smartphone, a tablet terminal, or the like, which the employee (the station staff member, the crew member, the person in charge of monitoring, or the like) carries with him/her. By being synchronized to a reporting operation in reporting apparatus 3, portable terminal 4 performs push notification for transmitting a notification signal from monitoring apparatus 2, and thus, with displaying on a prescribed alert screen or vibration, reports the insertion state of the foreign substance in the door to the employee. Furthermore, access to monitoring apparatus 2 can display the monitoring screen in the same manner as on monitor 21.

Accordingly, because the employee can receive the report that the inserting of the foreign substance into the door occurs, in portable terminal 4 at an arbitrary place, the employee can quickly start a job of removing the inserted foreign substance.

Figure 2:
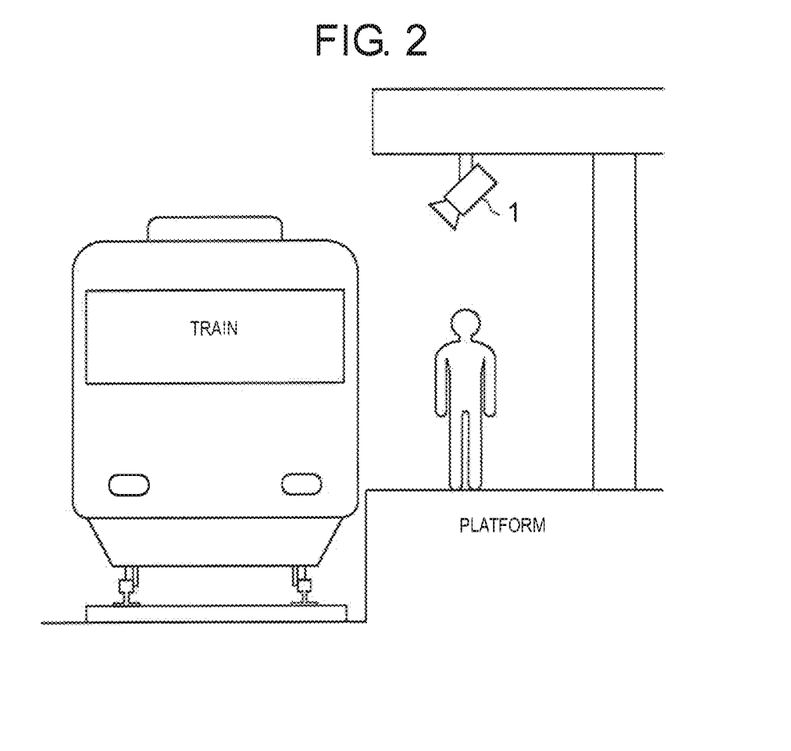
FIG. 2 is a descriptive diagram illustrating an installed situation of camera 1.

Next, an installed situation of camera 1 is described. FIG. 2 is a descriptive diagram illustrating an installed situation of camera 1.

Camera 1 is installed on the side of the station platform, for example, on a roof or pillar of the platform, and image-captures the vicinity of the train door obliquely from above. Furthermore, camera 1 is installed in a position that corresponds to each door of the train in a state where the train stops, and image-captures each door individually. Furthermore, camera 1 may be installed in such a manner that multiple doors fall within a range of image-capturing by camera 1. In such a case, it is determined whether or not the foreign substance is inserted into each of the multiple doors that are projected onto the captured image.

Next, the determination area that is set to be in the camera image is described. FIGS. 3A, 3B, 4A, and 4B are descriptive diagrams each illustrating a situation of the determination area that is set to be in the camera image.

As illustrated in FIGS. 3A, 3B, 4A, and 4B, camera 1 image-captures individually each door of one train that stops in a station, and projects a peripheral edge of one door onto the camera image. At this point, when a position in which the train stops is shifted from the normal position, as illustrated in FIGS. 3A, 3B, 4A, and 4B, a position of the door in the camera image is shifted as well.

Thus, in the present embodiment, an area of the door is detected from the camera image, positional information on the area is acquired, and based on the positional information, the determination area when determining whether or not the foreign substance is inserted is set.

Figure 3A:
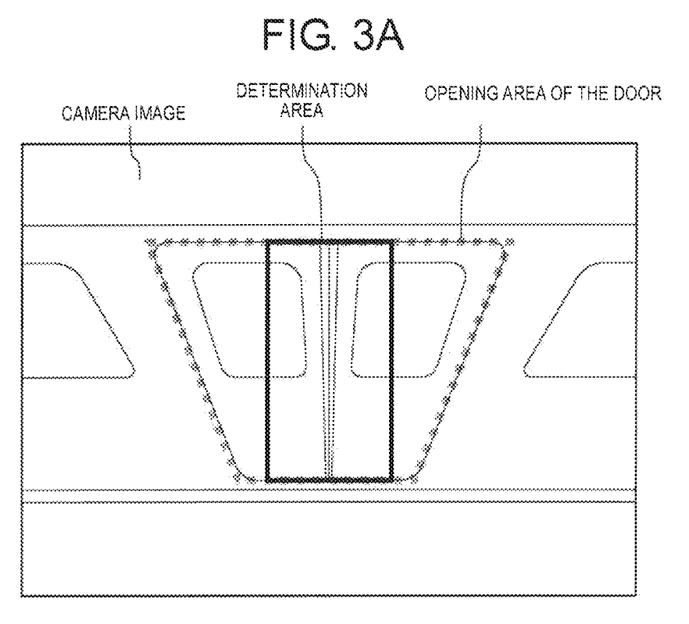
FIG. 3A is a descriptive diagram illustrating a situation of a determination area that is set to be in a camera image of a door in a normal position.
Figure 3B:
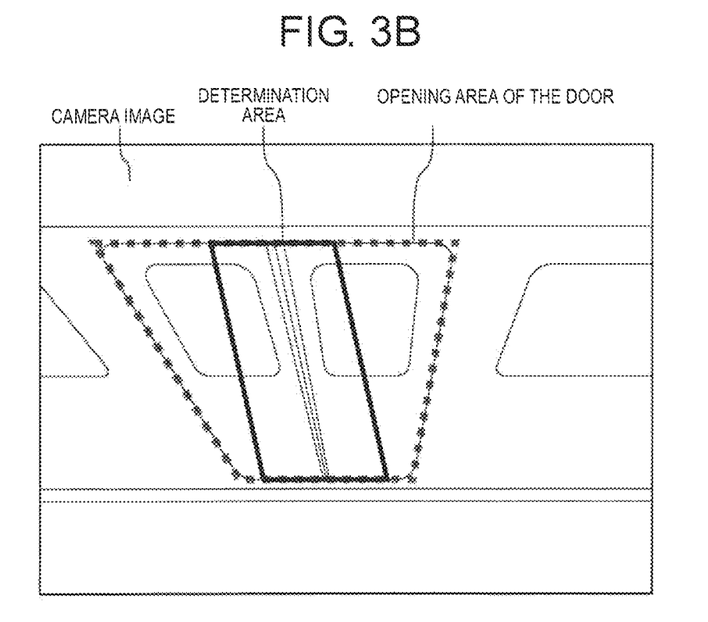
FIG. 3B is a descriptive diagram illustrating a situation of the determination area that is set to be in the camera image of the door whose position is shifted.

Particularly, in an example that is illustrated in each of FIGS. 3A and 3B, an opening area of the door, that is, an area that is defined by an order between a car body and a door panel is detected from the camera image, and thus the determination area is set based on positional information of the opening area. In this case, the determination area is set to have a range of prescribed widths that extend in the leftward and the rightward directions from the center of a detected area of the opening area.

Figure 4A:
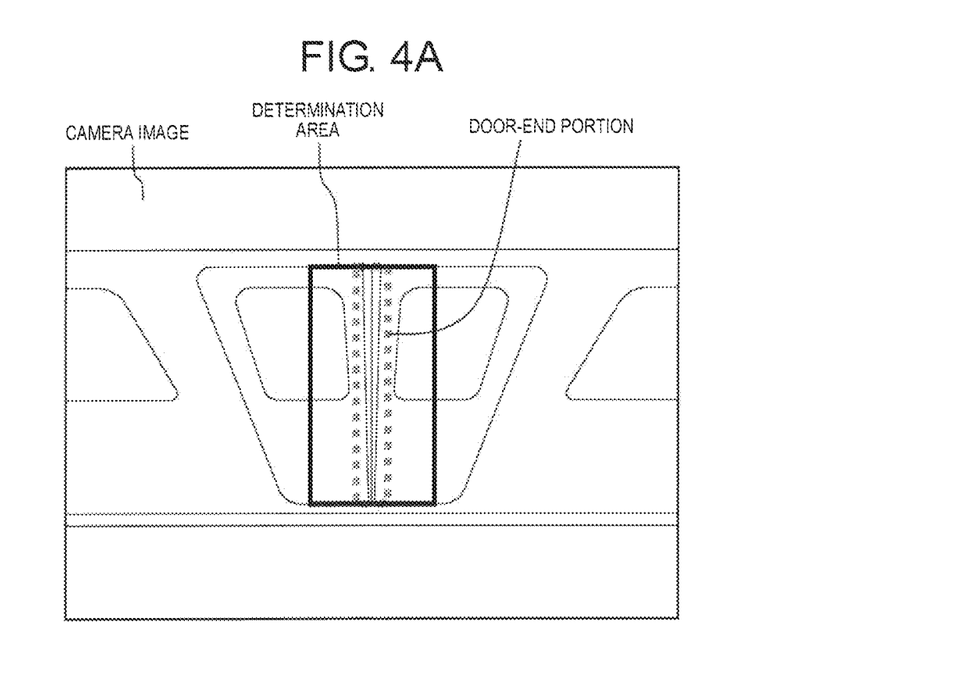
FIG. 4A is a descriptive diagram illustrating a situation of the determination area that is set to be in the camera image of the door in the normal position.
Figure 4B:
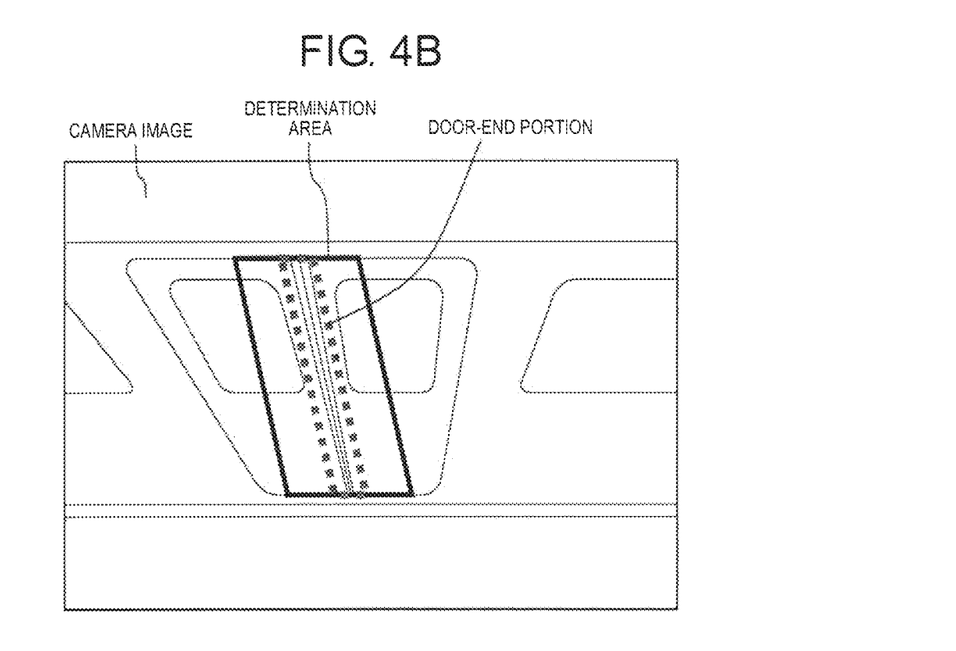
FIG. 4B is a descriptive diagram illustrating a situation of the determination area that is set to be in the camera image of the door whose position is shifted.

On the other hand, in an example that is illustrated in each of FIGS. 4A and 4B, the end portion (a door stop rubber) of the door, that is, an area where portions of left and right doors are brought into contact with each other is detected, and the determination area is set based on positional information on the door-end portion. In this case, the determination area is set to have a range of prescribed widths that extend in the leftward and the rightward directions from the center of the detected area of the door-end portion.

In the example that is illustrated in each of FIGS. 3A, 3B, 4A, and 4B, the determination area is set to be in the camera area that results from image-capturing the door obliquely from above. However, a distortion in the camera image may be compensated for in such a manner that the door is in its state that is obtained when viewed from front, and then the determination area may be set.

Furthermore, in the example that is illustrated in each of FIGS. 3A, 3B, 4A, and 4B, a double-wing type door is assumed, but even in the case of a single-wing type door, in the same manner, the insertion state of the foreign substance can be detected. Furthermore, the determination area can be set to have various shapes, such as a trapezoidal shape and a parallelogrammatic shape, in addition to a rectangular shape.

Figure 5:
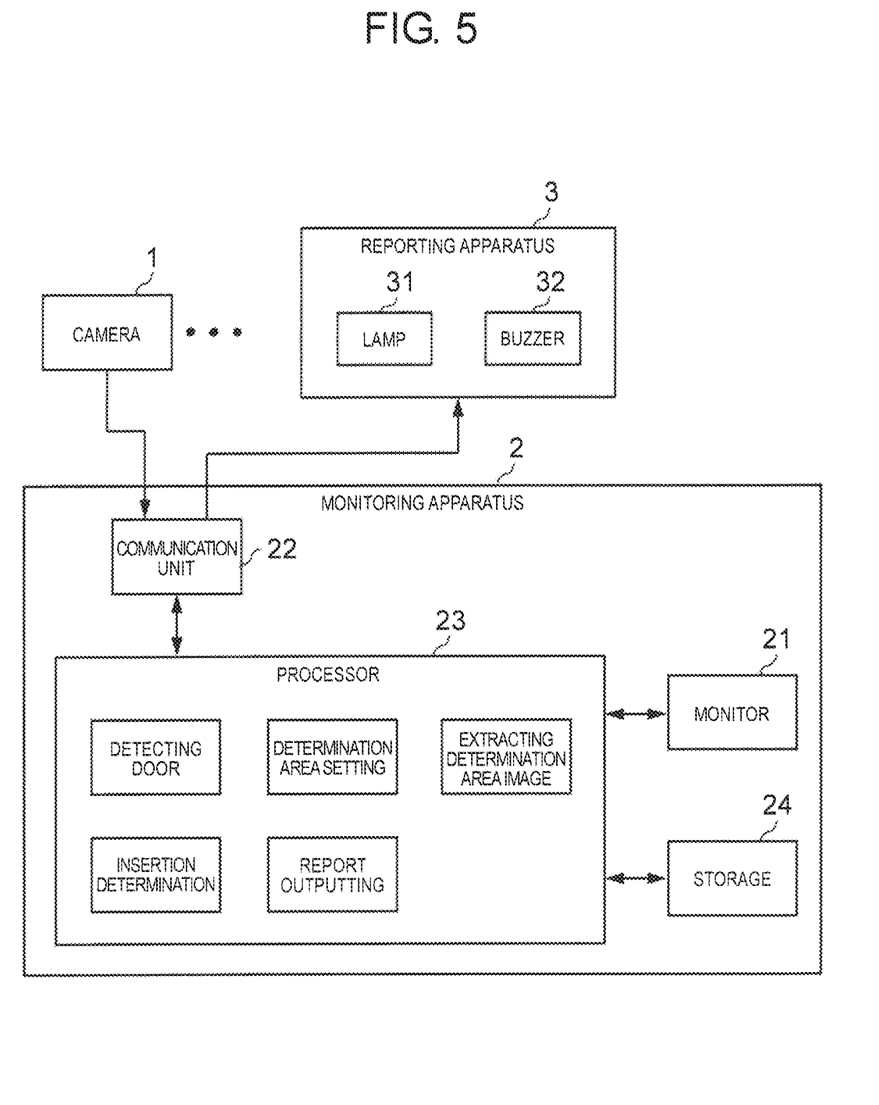
FIG. 5 is a block diagram illustrating a schematic configuration of monitoring apparatus 2.

Next, monitoring apparatus 2 is described. FIG. 5 is a block diagram illustrating a schematic configuration of monitoring apparatus 2.

Monitoring apparatus 2 includes monitor 21, communication unit 22, processor 23, and storage 24.

Communication unit 22 performs communication between camera 1 and reporting apparatus 3 through a network. In the present embodiment, the camera image that is transmitted from each camera 1 is received. Furthermore, control information for causing reporting apparatus 3 to perform the reporting operation is transmitted to reporting apparatus 3.

The camera image that is received in communication unit 22, various pieces of setting information, and a program that is executed in processor 23 are stored in storage 24.

Processor 23 performs various processing operations by executing the program stored in storage 24. In the present embodiment, processing operations are performed, such as detecting the door, setting the determination area, extracting a determination area image, determining an insertion, and outputting a report.

In door detection processing, an area of the door is detected from the camera image, and thus positional information on the area is acquired. In the present embodiment, the opening area of the door (refer to FIGS. 3A and 3B), or the door-end portion of the door (refer to FIGS. 4A and 4B) is detected, and thus the positional information on the opening area or the door-end portion is acquired.

In the door detection processing, the camera image may be acquired at a timing at which the door is in a closed state, and thus the area of the door (the opening area or the door-end portion) may be detected from feature information that is extracted from the camera image in the state where the door is in the closed state. Furthermore, the camera image may also be acquired at a timing at which the door is in an opened state, and thus the area of the door may be detected based on both the feature information in the opened state of the door and the feature information in the closed state of the door.

In determination setting processing, the determination area that is a target for insertion determination is set, based on the positional information on the area (the opening area or the door-end portion) of the door acquired by the door detection processing.

In determination area image extraction processing, the image of the determination area is cut off from the camera image based on the positional information on the determination area acquired in the determination area setting processing.

In insertion determination processing, whether or not the foreign substance inserted into the door is present, that is, which of the normal state where the foreign substance is not inserted and the abnormal state where the foreign substance is inserted is entered is determined based on the image of the determination area acquired in the determination area image acquisition processing.

In report outputting processing, information for performing the reporting operation in accordance with a result of the determination in the insertion determination processing is output. In the present embodiment, monitor 21 and reporting apparatus 3 are caused to perform the reporting operation. That is, display information is output to monitor 21, and thus the insertion state of the foreign substance (the normal state and the abnormal state) is displayed on monitor 21 for reporting to the user. Furthermore, the control information for causing reporting apparatus 3 to perform a prescribed reporting operation is output to reporting apparatus 3. Thus, by lighting lamp 31 and sounding buzzer 32 in reporting apparatus 3, the insertion state of the foreign substance is reported to the user.

With transformation of the door stop rubber provided on the tip of the door, a sensor (not illustrated) that detects that the foreign substance is inserted, is provided in the train, but the detection of the insertion of the foreign substance by the sensor and the detection of the insertion of the foreign substance according to the present embodiment can be concurrently performed. In the sensor that uses the transformation of the door stop rubber, a fine foreign substance or a thin foreign substance, for example, a foreign substance, such as a belt buckle, an umbrella tip, or clothes, cannot be detected with high precision, but according to the present embodiment, these foreign substances can be detected with high precision.

Incidentally, in the insertion determination processing, the discriminator is used that, with deep learning, is caused to learn, two classes, the normal state where the foreign substance is not inserted, and the abnormal state where the foreign substance is inserted. When the insertion determination is made, with the discriminator, a likelihood (probability) of the normal state relating to the image of the determination area and a likelihood of the abnormality state, which relate to the image of the determination area, are obtained, the two likelihoods are compared, and thus which of the normal state and the abnormal state is entered is determined.

Furthermore, in the door detection processing, with the deep learning, the discriminator is also used that is caused to learn in advance areas of the doors (opening area or door-end portions) of various trains that are targets. When the door is detected, with the discriminator, a likelihood of an area of a door (an opening area or a door-end portion), which relates to each area within the camera image is obtained, and, if an area in which the likelihood exceeds a threshold, is present, it is determined that the area is the area of the door.

In this manner, a deep learning technique is employed, and thus the insertion determination or the door detection can be performed, with high precision, on various types of trains, or on trains on which lapping is performed. Furthermore, the insertion determination or the door detection can be performed that is not easily subject to an influence due to a change in sunshine. Furthermore, in the insertion determination, a state where various foreign substance are inserted can be detected.

Figure 6:
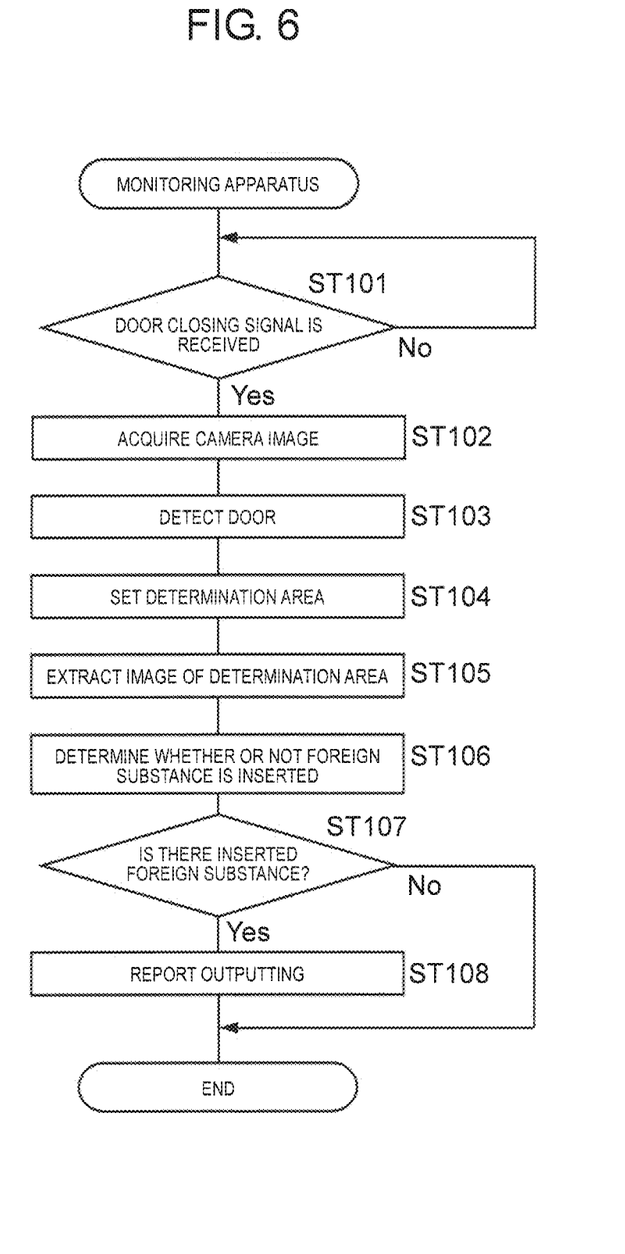
FIG. 6 is a block diagram illustrating a procedure for processing that is performed in monitoring apparatus 2.

Next, a procedure for processing that is performed in monitoring apparatus 2 is described. FIG. 6 is a block diagram illustrating the procedure that is performed in monitoring apparatus 2.

In the present embodiment, the image of the determination area is acquired at a timing at which the door of the train is opened, and it is determined whether or the inserted foreign substance is present.

Specifically, in processor 23 of monitoring apparatus 2, first, when it is detected that a door closing signal is received which is output according to an opening and closing switch of the door being operated by the crew member of the train (ST101), the camera image is acquired from camera 1 (ST102). Next, a door is detected from the camera image, the positional information on the door is acquired (ST103). Next, based on the positional information on the door, the determination area is set (ST104). Next, the image of the determination area is extracted from the camera image (ST105). Next, based on the image of the determination area, it is determined whether or not the inserted foreign substance is present (ST106).

In the insertion determination, in a case where it is determined that the foreign substance is inserted (YES in ST107), the report outputting for causing monitor 21 or reporting apparatus 3 to perform prescribed reporting operation is performed (ST108). On the other hand, in a case where it is determined that the foreign substance is not inserted (No in ST107), a special operation is not performed.

In the example that is illustrated in FIG. 6, in order to detect that the door of the train is closed, the door closing signal is received, but, without being limited to the door closing signal, any notification signal which is transmitted from an operation apparatus installed in the crew member room of the train, or the monitoring room or the platform of the station may be received at a timing at which the door is closed or at a timing at which the train starts to be moved, such as an operating signal of a departure bell.

Figure 7:
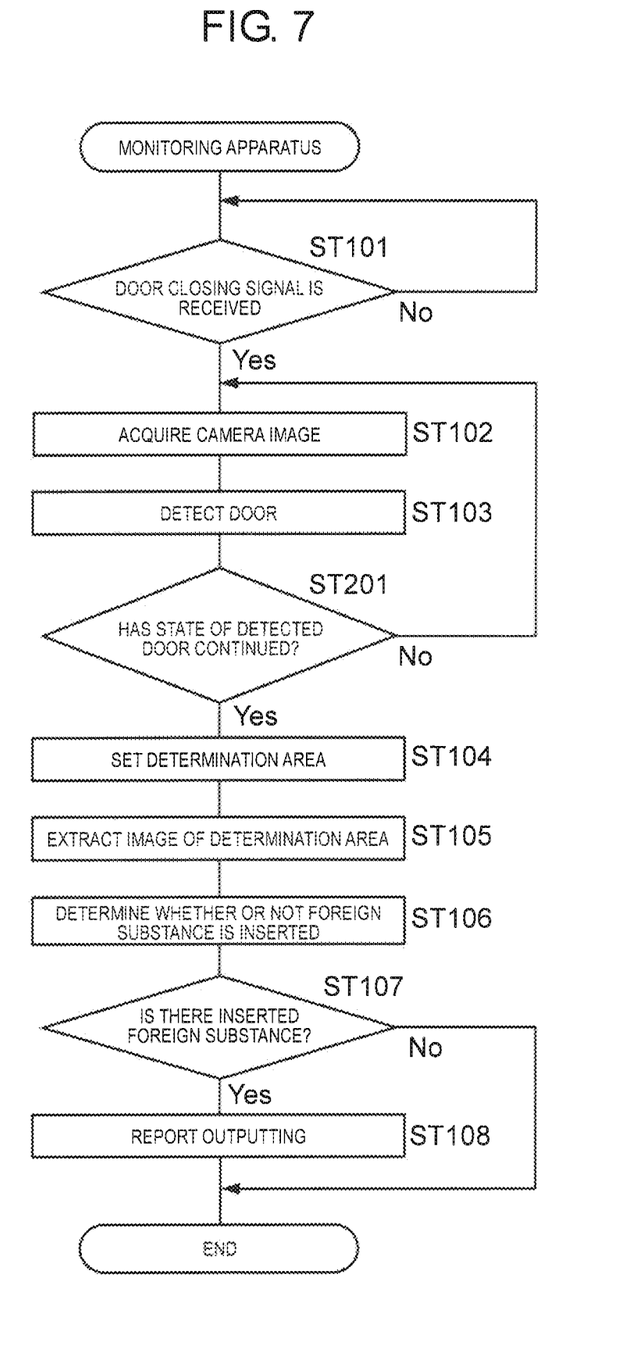
FIG. 7 is a block diagram illustrating another example of the procedure for the processing that is performed in monitoring apparatus 2.
Figure 8:
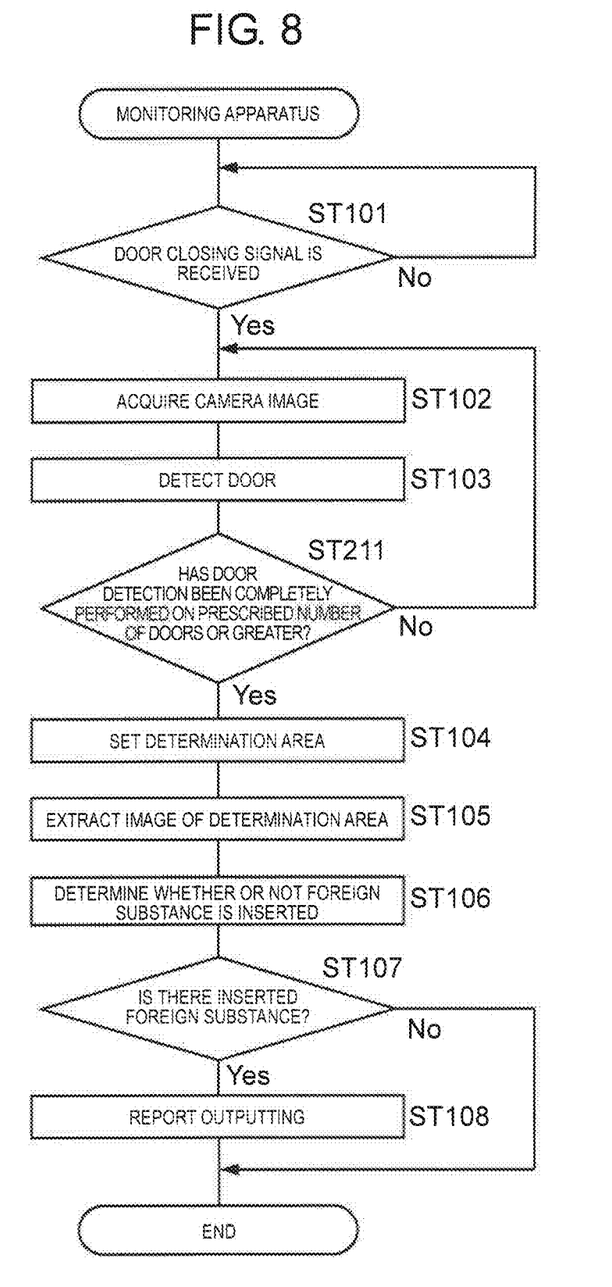
FIG. 8 is a block diagram illustrating another example of the procedure for the processing that is performed in monitoring apparatus 2.

Next, a procedure for processing that is performed in monitoring apparatus 2 is described. FIGS. 7 and 8 are block diagrams each illustrating another example of the procedure for the processing that is performed in monitoring apparatus 2.

In an example that is illustrated in FIG. 7, at a timing at which the state where the door (the opening area or the door-end portion) in the closed state is detected from the camera image has continued for a prescribed time, it is determined whether or not the foreign substance is inserted. In monitoring apparatus 2, the camera image that is transmitted from camera 1 is received periodically at a prescribed time interval.

Specifically, in processor 23 of monitoring apparatus 2, first, when it is detected that the door closing signal is received which is output according to the opening and closing switch of the door being operated by the crew member of the train (ST101), the camera image is acquired from camera 1 (ST102). Next, a door is detected from the camera image, the positional information on the door is acquired (ST103). Next, it is determined whether or not the state where the door in the closed state is detected from the camera image has continued for the prescribed time (ST201).

At this point, in a case where the state where the door in the closed state is detected from the camera image has not continued for the prescribed time (No in ST201), processing to the processing of the next camera image takes place, and the processing operations subsequent to the acquisition of the camera image (ST102) are repeated.

On the other hand, in a case where the state where the door in the closed state is detected from the camera image has continued for the prescribed time (Yes in ST201), next, the determination area is set based on the positional information on the door, which is acquired in the detection of the door (ST103) (ST104). The example that is illustrated in FIG. 6 applies hereinafter in the same manner.

In an example that is illustrated in FIG. 7, in the same manner as in the example that is illustrated in FIG. 6, the acquisition of the camera image (ST101) is set to be started at a timing at which the door signal is received, but processing that detects the door from the camera image which is received from camera 1 may be always performed.

In an example that is illustrated in FIG. 8, it is determined whether or not the foreign substance is inserted, at a timing at which the processing that detects the door in the closed state from the camera image is completely performed on the prescribed number of doors or greater.

Specifically, in processor 23 of monitoring apparatus 2, first, when it is detected that the door closing signal is received which is output according to the opening and closing switch of the door being operated by the crew member of the train (ST101), the camera image is acquired from camera 1 (ST102). Next, a door is detected from the camera image, the positional information on the door is acquired (ST103). Next, it is determined whether or not processing that detects the door in the closed state from the camera image is completely performed on a prescribed number of doors or greater (ST211).

At this point, in a case where the processing that detects the door in the closed state from the camera image is not completely performed on the prescribed number of doors or greater (No in ST211), proceeding to the processing of the next camera image takes place, and processing operations subsequent to the acquisition of the camera image (ST102) are repeated.

On the other hand, in a case where the processing that detects the door in the closed state from the camera image is completely performed on the prescribed number of doors or greater (Yes in ST211), next, the determination area is set based on the positional information on the door, which is acquired in the detection of the door (ST103) (ST104). The example that is illustrated in FIG. 6 applies hereinafter in the same manner.

In the example that is illustrated in each of FIGS. 7 and 8, in the same manner as in the example that is illustrated in FIG. 6, the acquisition of the camera image (ST101) is set to be started at a timing at which the door closing signal is received, but the processing that detects the door from the camera image received from camera 1 may be always performed.

Furthermore, the determination (ST201) of whether or not the state where the door is detected has continued, which is illustrated in FIG. 7, and the determination of the number of detections of the doors that is illustrated in FIG. 8 (ST211) may be made in a combined manner. That is, in a case where the fact that the state where the door in the closed state is detected from the camera image has continued for the prescribed time, is confirmed on the prescribed number of doors or greater, proceeding to setting of the determination area (ST104) is set to take place.

Furthermore, in the present embodiment, according to the reception of the door closing signal, the monitoring operations (the door detection, the determination area setting, and the insertion determination) is set to be started, but the door in the closed state may be detected from the camera image and thus the monitoring operation may be started.

Figure 9:
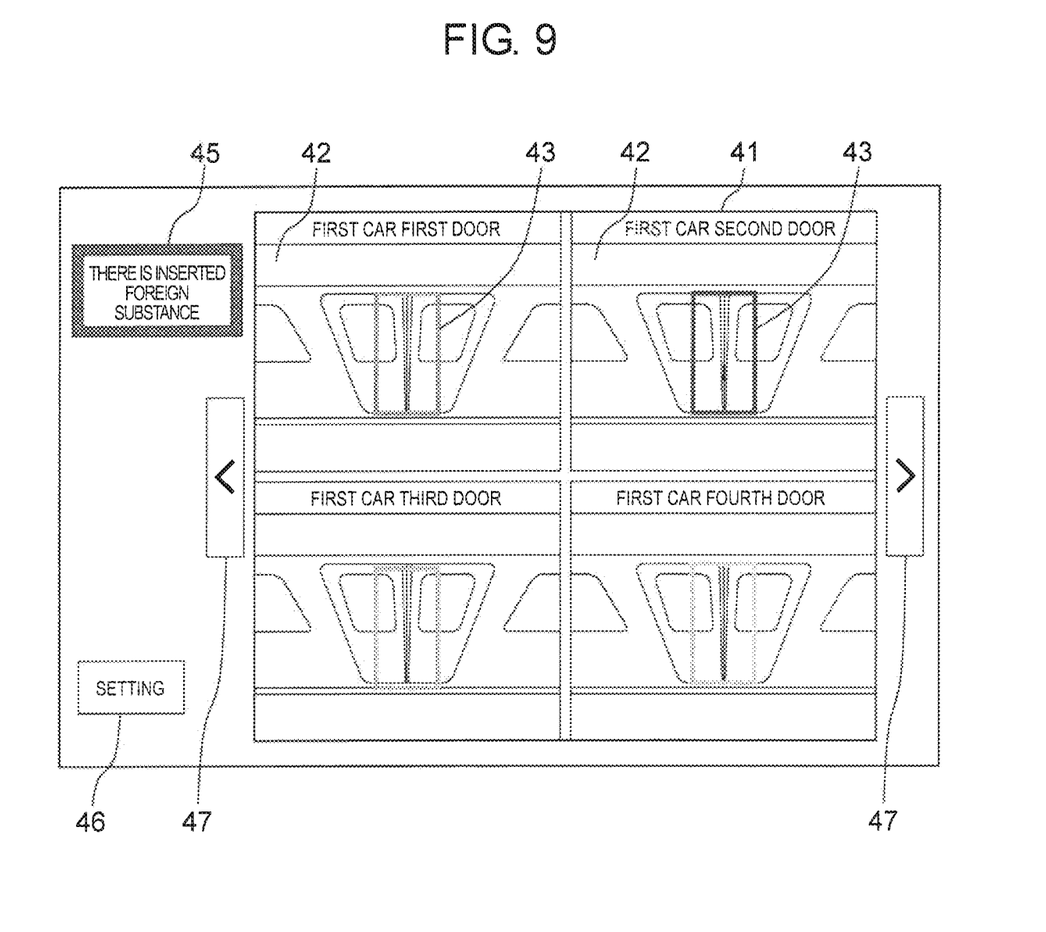
FIG. 9 is a descriptive diagram illustrating a monitoring screen that is displayed on monitor 21.

Next, the reporting operation that is performed in monitor 21 is described. FIG. 9 is a descriptive diagram illustrating the monitoring screen that is illustrated in monitor 21.

The monitoring screen is one through which a person in charge of monitoring monitors the door of the train. Camera image display part 41 is provided on the monitoring screen, multiple camera images 42 each of which results from image-capturing the vicinity of each door of one train are displayed on camera image display part 41 in a manner that is arranged in a line, and thus the employee (the station staff member or the like) can check an actual situation of each door. Furthermore, in a case where multiple cars are coupled to each other and where a situation of each door of another car is displayed, camera image 42 of another car is set to be read using image forwarding button 47. Furthermore, a train icon (not illustrated) that represents a train composition is displayed on a portion of the monitoring screen, and camera image 42 of a designated car may be read according to an operation of designating a car that is desired to be displayed. In a case where the train icon is used, a display mode that is different from that in which a car in which the insertion of the foreign substance does not occur is displayed may be entered in such a manner that a car in which the insertion of the foreign substance occurs is recognized at first glance.

In camera image display part 41, when the determination area is set, frame-shaped image 43 (a state image) that represents the determination area is displayed on camera image 42 in a superimposed manner. In frame-shaped image 43, a display format changes according to the insertion state of the foreign substance (the normal state and the abnormal state). Specifically, when it is detected that the foreign substance is inserted, a color of frame-shaped changed 43 changes. For example, in the normal state where the foreign substance is not inserted, frame-shaped image 43 is displayed in green, and in the abnormal state where the insertion of the foreign substance occurs, frame-shaped image 43 changes to red. Accordingly, the presence or absence of the foreign substance inserted into each door can be reported to the person in charge of monitoring.

Furthermore, state display icon 45 is displayed on the monitoring screen. State display icon 45 changes in display format according to the insertion state (the normal state and the abnormal state) of the foreign substance (refer to FIGS. 10A and 10B). For example, in the normal state where the foreign substance is not inserted, state display icon 45 is displayed in green, and a message "foreign substance is not inserted" is displayed on the state display icon 45. In the abnormal state where the insertion of the foreign substance occurs, state display icon 45 is displayed in red, and a message "foreign substance is inserted" is displayed on state-display icon 45.

Targets for state display icon 45 are all doors of one train, and if only one foreign substance is inserted in one door of all the doors of one train, state display icon 45 changes to the display format for the abnormal state. Accordingly, the presence or absence of the inserted foreign substance in one train can be reported to the person in charge of monitoring.

Furthermore, setting button 46 is provided on the monitoring screen. When setting button 46 is operated, transitioning to a setting screen that is not illustrated takes place. From the setting screen, the user can designate various processing conditions (a determination threshold value and the like) and the like.

In the present embodiment, when it is detected that the foreign substance is inserted, frame-shaped image 43 representing the determination area is set to change in color, but the change in the display format of frame-shaped image 43 is not limited to this. For example, frame-shaped image 43 is not displayed at the normal time, and when it is detected that the foreign substance is inserted, frame-shaped image 43 may be set to be displayed. Furthermore, frame-shaped image 43 is displayed at the normal time, and when it is determined that the foreign substance is inserted, frame-shaped image 43 may be set to be displayed in a blinking manner. Furthermore, when it is detected that the foreign substance is inserted, frame-shaped image 43 is displayed in an emphasized manner, and for example, the thickness of a boundary line (a grid-line) of the frame-shaped image may be set to change.

Figure 10A:
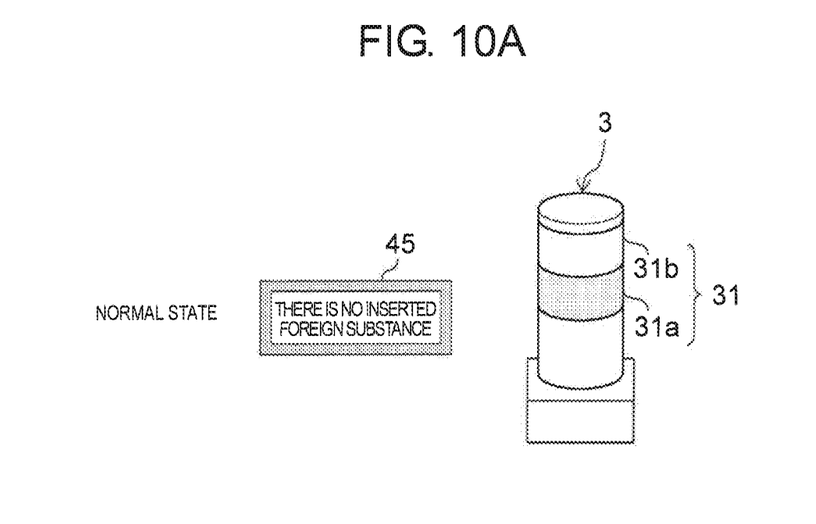
FIG. 10A is a descriptive diagram illustrating an outline of a reporting operation in the normal state, which is performed in reporting apparatus 3.
Figure 10B:
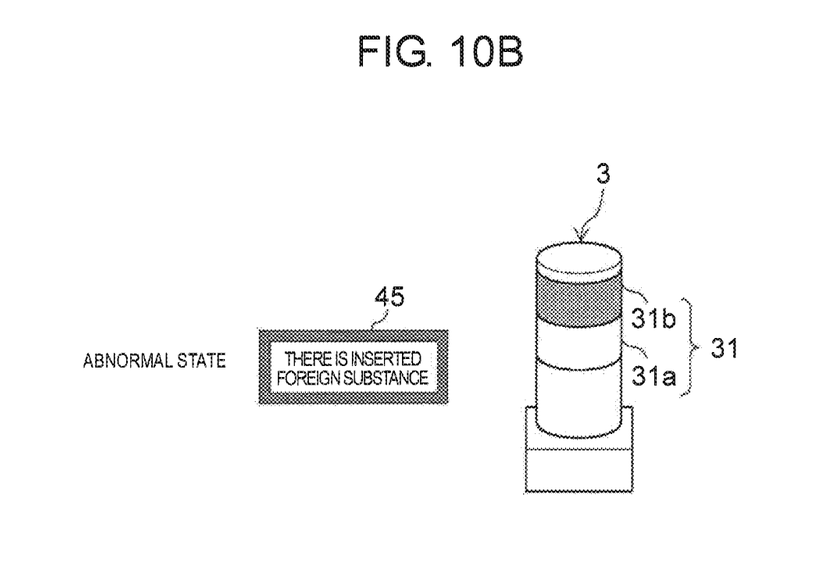
FIG. 10B is a descriptive diagram illustrating an outline of a reporting operation in an abnormal state, which is performed in reporting apparatus 3.

Next, the reporting operation that is performed in reporting apparatus 3 is described. FIGS. 10A and 10B are descriptive diagrams each illustrating an outline of the reporting operation that is performed in reporting apparatus 3.

Green and red lamps 31a and 31b are provided in reporting apparatus 3. By changing lighted states of lamps 31a and 31b, as is the case with state display icon 45, which of the normal state where the foreign substance is not inserted and the abnormal state where the foreign substance is inserted is entered is reported to the person in charge of monitoring. Specifically, for example, in the normal state, green lamp 31a is lighted and in the abnormal state, red lamp 31b is lighted.

Furthermore, in reporting apparatus 3, with the sounding of buzzer 32, in addition to the lighting of lamp 31, a change from the normal state to the abnormal state is reported to the person in charge of monitoring.

Reporting apparatus 3 includes green, yellow, and red lamps and in determining whether or not the foreign substance is inserted, the yellow lamp may be set to be lighted in a case where the precision of determination is low. Furthermore, reporting apparatus 3 includes one lamp. When the abnormal state is entered, the lamp may be lighted and may be blinked.

The reporting of the abnormal state where the insertion of the foreign substance occurs may be canceled manually by the person in charge of monitoring but the canceling of the reporting of the abnormal state may be performed automatically by monitoring apparatus 2. That is, when the monitoring operation is set to continue to be performed in monitoring apparatus 2 until the train starts to move, the foreign substance inserted in the door is removed, and thus it can also is detected that a change to the normal state where the foreign substance is not inserted occurs. For this reason, state display icon 45 that is displayed on the monitoring screen of monitor 21 or reporting apparatus 3 is caused to return to its normal state, and thus it can be reported to the person in charge of monitoring that the foreign substance inserted into the door is removed.

The embodiment is described above taking as an example the technology that is disclosed in the present application. However, the technology in the present disclosure is not limited to this, and can also apply to an embodiment that results from amendment, substitution, addition, and omission, and the like. Furthermore, it is also possible that a combination of the constituent elements which are described above in the embodiment described above is set to be a new embodiment.

For example, in the embodiment described above, it is set to be detected that the foreign substance is inserted into the door of the train (the railroad car), but it may be set to be detected that a foreign substance is inserted into a door of any other car, such as a bus, without a target for detection of the foreign substance being limited to the door of the train.

INDUSTRIAL APPLICABILITY

A car door monitoring system and a car door monitoring method according to the present disclosure are useful as a car door monitoring system, a car door monitoring method, or the like in which, even in a case where an external camera image-captures a door of a car, an effect in which with high efficiency, it can be determined whether or not a foreign substance is inserted into the door is achieved, in which it is determined whether or not the foreign substance inserted into the door is present, based on a camera image that results from the external camera image-capturing the vicinity of the door of the car, and in which reporting is performed according to a result of the determination.

REFERENCE MARKS IN THE DRAWINGS

1 CAMERA (EXTERNAL CAMERA)
2 MONITORING APPARATUS
3 REPORTING APPARATUS
4 PORTABLE TERMINAL
21 MONITOR (DISPLAY APPARATUS)
22 COMMUNICATION UNIT
23 PROCESSOR
24 STORAGE
42 CAMERA IMAGE
43 FRAME-SHAPED IMAGE (STATE IMAGE)

The invention claimed is:

1. A car door monitoring system in which it is determined whether or not a foreign substance inserted into a door is present, based on a camera image that results from an external camera image-capturing the vicinity of the door of a car, and thus processing that performs reporting according to a result of the determination is performed by a processor,
wherein the processor detects the door from the camera image, sets a determination area based on a position of the detected door, acquires an image of the determination area from the camera image, determines whether or not the foreign substance inserted into the door is present, based on the image of the determination area, and performs report outputting according to a result of the determination,
wherein the processor determines whether or not the foreign substance inserted into the door is present, using a discriminator that learns in advance two classes, the two classes including a normal state where the foreign substance is not inserted, and an abnormal state where the foreign substance is inserted.

2. The car door monitoring system of claim 1,
wherein the processor detects an opening area of the door, which is projected onto the camera image, and sets the determination area based on a position of the opening area.

3. The car door monitoring system of claim 1,
wherein the processor detects a door-end portion of the door, which is projected onto the camera image, and sets the determination area based on a position of the door-end portion.

4. The car door monitoring system of claim 1,
wherein at a timing at which a state where the door is detected from the camera image has continued for a prescribed time, the processor determines whether or not the foreign substance inserted into the door is present.

5. The car door monitoring system of claim 1,
wherein at a timing at which processing that detects the door from the camera image is completely performed on a prescribed number of the doors or greater, the processor determines whether the foreign substance inserted into the door is present.

6. The car door monitoring system of claim 1,
wherein the processor transmits a control signal for causing a reporting apparatus to perform a prescribed reporting operation, as the report outputting.

7. The car door monitoring system of claim 1,
wherein the processor displays a state image in accordance with whether or not the foreign substance inserted into the door is present, as the report outputting, on a display device, in a manner that is superimposed onto the camera image.

8. The car door monitoring system of claim 1,
wherein the processor transmits a notification signal for causing a portable terminal that an employee carries with him/her to perform a prescribed reporting operation, as the report outputting.

9. A car door monitoring method in which it is determined whether or not a foreign substance inserted into a door is present, based on a camera image that results from an external camera image-capturing the vicinity of the door of a car, and thus processing that performs reporting according to a result of the determination is performed by a processor, the method comprising:
detecting the door from the camera image;
setting a determination area based on a position of the detected door;
acquiring an image of the determination area from the camera image;
determining whether or not the foreign substance inserted into the door is present, based on the image of the determination area; and
performing report outputting according to a result of the determination,
wherein the determining determines whether or not the foreign substance inserted into the door is present, using a discriminator that learns in advance two classes, the two classes including a normal state where the foreign substance is not inserted, and an abnormal state where the foreign substance is inserted.

* * * * *